(12) United States Patent
Kapanka

(10) Patent No.: US 6,474,586 B1
(45) Date of Patent: Nov. 5, 2002

(54) SEAT BELT RETRACTOR WITH ENERGY ABSORBING COVER

(75) Inventor: Harley L. Kapanka, Rochester, MI (US)

(73) Assignee: TRW Vehicle Safety Systems Inc., Lyndhurst, OH (US)

(*) Notice: Subject to any disclaimer, the term of this patent is extended or adjusted under 35 U.S.C. 154(b) by 6 days.

(21) Appl. No.: 09/689,234

(22) Filed: Oct. 11, 2000

(51) Int. Cl.[7] ............................................... B65H 75/44
(52) U.S. Cl. ..................... 242/379.1; 280/806; 297/476
(58) Field of Search ........................... 242/379.1, 379, 242/379.2, 382, 382.1; 280/806, 807; 297/468, 473, 474, 475, 476, 477, 478; 248/345.1

(56) References Cited

U.S. PATENT DOCUMENTS

| | | | |
|---|---|---|---|
| 4,381,086 A | 4/1983 | Pfeiffer | |
| 5,842,674 A | * 12/1998 | Freeman | ................... 248/345.1 |
| 5,924,641 A | 7/1999 | Keller et al. | |
| 6,082,655 A | * 7/2000 | Verellen et al. | ............. 242/379 |

* cited by examiner

Primary Examiner—William A. Rivera
(74) Attorney, Agent, or Firm—Tarolli, Sundheim, Covell, Tummino & Szabo L.L.P.

(57) ABSTRACT

A seat belt retractor (10) comprises a spool (32) supported on a base (30) for rotation relative to the base about an axis (36) in a belt retraction direction and an opposite belt withdrawal direction. A length of belt webbing (16) wound on the spool (32) is extensible from the retractor (10) for helping to protect an occupant of the vehicle. The retractor (10) includes a spool locking mechanism (42) for blocking rotation of the spool (32) in the belt withdrawal direction. A sensor mechanism (44) is supported on the base (30). A cover (50) secured to the base (30) has a main body portion (52) covering the sensor mechanism (44). The cover (50) has a plurality of legs (70–76) projecting from the main body portion (52). The legs (70–76) are resiliently deformable to absorb energy of impact to the retractor (10).

12 Claims, 2 Drawing Sheets

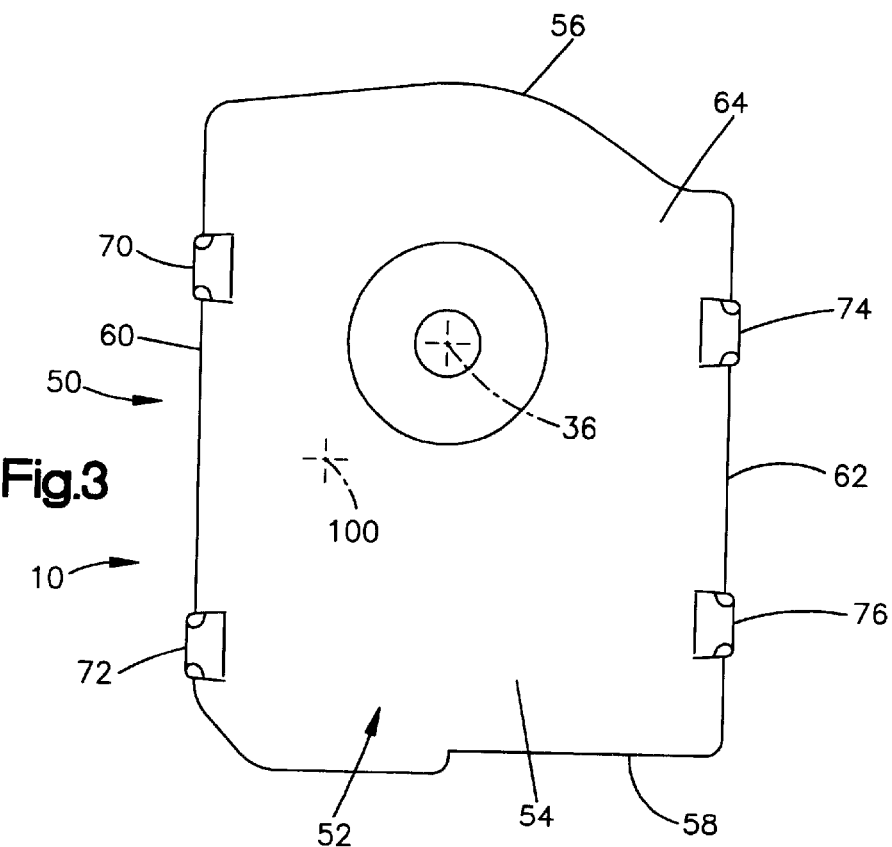
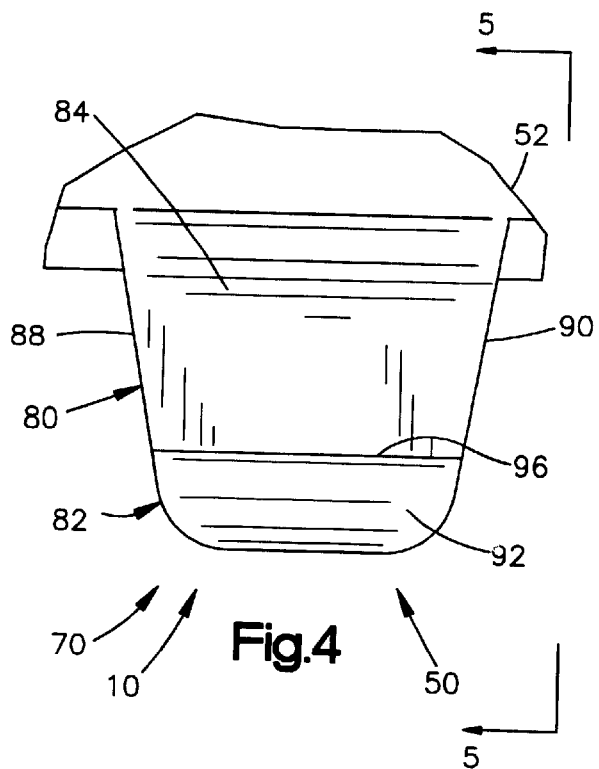
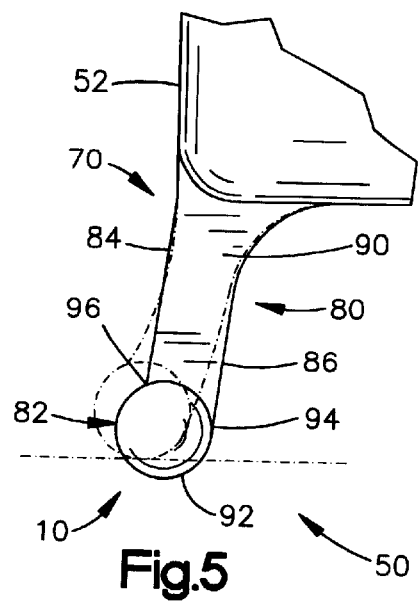

SEAT BELT RETRACTOR WITH ENERGY ABSORBING COVER

BACKGROUND OF THE INVENTION

1. Technical Field

The present invention relates to a seat belt retractor having a portion for absorbing energy of an impact to the retractor.

2. Description of the Prior Art

A known vehicle seat belt retractor includes a sensor mechanism for actuating a spool locking mechanism of the retractor. The retractor must be able to pass a "drop test"; that is, the retractor must be able to withstand being dropped from a height of one meter onto a hard ground surface without damage to the sensor mechanism. It is known to cover a portion of the retractor with a piece of foam to cushion the retractor, to enable the retractor to pass the drop test.

SUMMARY OF THE INVENTION

The present invention is a seat belt retractor comprising a spool supported on a base for rotation relative to the base about an axis in a belt retraction direction and an opposite belt withdrawal direction. A length of belt webbing wound on the spool is extensible from the retractor for helping to protect an occupant of the vehicle. The retractor includes a spool locking mechanism for blocking rotation of the spool in the belt withdrawal direction.

A sensor mechanism is supported on the base. A cover secured to the base has a main body portion covering the sensor mechanism. The cover has a plurality of legs projecting from the main body portion. The legs are resiliently deformable to absorb energy of impact to the retractor.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 3 is a plan view of the sensor cover of FIG. 2;

FIG. 4 is an enlarged view of an energy absorbing leg that forms part of the sensor cover of FIG. 1; and FIG. 5 is a view of the leg of FIG. 4 taken along line 5—5 of FIG. 4.

DETAILED DESCRIPTION OF EMBODIMENTS OF THE INVENTION

Figure 1:
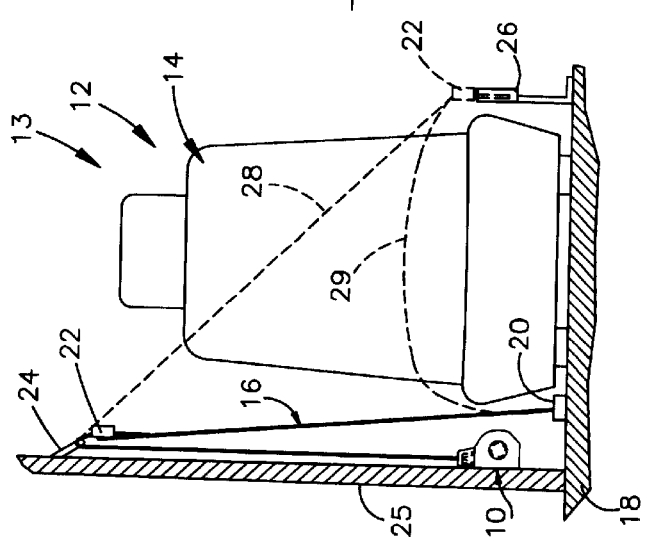
FIG. 1 is a schematic illustration of a vehicle seat belt system including a retractor constructed in accordance with the present invention.

The present invention relates to a seat belt retractor including a cover for absorbing energy of impact to the retractor. The present invention is applicable to various seat belt retractor constructions. As representative of the invention, FIG. 1 illustrates a retractor 10, which forms part of a three-point continuous loop seat belt system 12 for use in helping to protect an occupant of a vehicle 13.

The occupant of the vehicle 13 sits on a vehicle seat 14, which is illustrated as a front passenger seat in the vehicle.

A length of seat belt webbing 16 is extensible about the vehicle occupant. One end of the length of belt webbing 16 is anchored to the vehicle body 18 at an anchor point 20 located on one side of the seat 14. The opposite end of the belt webbing 16 is attached to the retractor 10, which is secured to the vehicle B-pillar 25 on the same side of the seat 14. Intermediate its ends, the belt webbing 16 passes through a tongue assembly 22 and a D-ring or turning loop 24 that is mounted to the B-pillar 25 above the retractor 10 and the anchor point 20. When the seat belt system 12 is not in use, the belt webbing 16 is wound on the retractor 10 and is oriented generally vertically on the one side of the seat 14, as shown in solid lines in FIG. 1.

To engage the seat belt system 12, the tongue assembly 22 is manually grasped and is pulled across the lap and torso of the occupant sitting in the seat 14. As the tongue assembly 22 is pulled across the lap and torso of the occupant, the tongue assembly moves along the belt webbing 16, and the belt webbing is unwound from the retractor 10. When the belt webbing 16 has been pulled across the lap and torso of the occupant, the tongue assembly 22 is connected with a buckle 26, as shown in dashed lines in FIG. 1. The buckle 26 is connected to the vehicle body 18 and is disposed on the side of the seat 14 opposite the anchor point 20. When the seat belt system 12 is thus buckled, the length of belt webbing 16 is divided by the tongue assembly 22 into a torso portion 28, which extends across the torso of the occupant, and a lap portion 29, which extends across the lap of the occupant.

Figure 2:
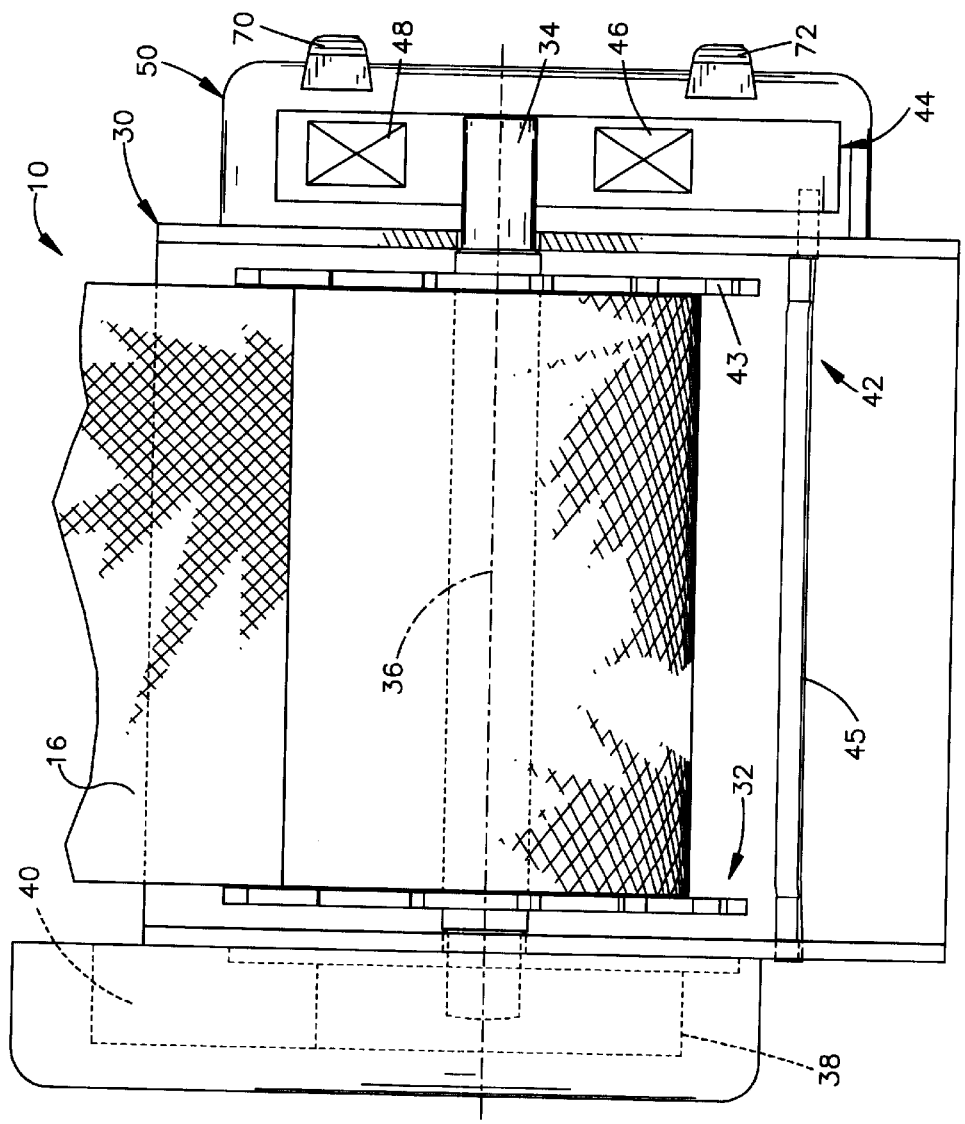
FIG. 2 is a side view of the retractor of FIG. 1, including a sensor cover.

The seat belt retractor 10 (FIG. 2) has a frame or base 30, which is secured to the B-pillar 25 in a manner not shown. A seat belt webbing spool 32 is supported for rotation relative to the base 30. The seat belt webbing 16 is wound on the spool 32. A hub 34 projects axially from the spool 32.

The spool 32 is rotatable relative to the base 30 about an axis 36 in a belt webbing withdrawal direction and an opposite belt webbing retraction direction. The retractor 10 includes a rewind spring assembly indicated schematically at 38, which acts between the base 30 and the spool 32 to bias the spool to rotate in the belt webbing retraction direction. The retractor 10 also includes a pretensioner indicated schematically at 40.

The retractor 10 includes a spool locking mechanism 42. The spool locking mechanism 42 includes a ratchet 43 and a pawl 45. The ratchet 43 is engageable by the pawl 45 to block rotation of the ratchet about the axis 36 in the belt withdrawal direction. This engagement blocks rotation of the spool 32 in the belt withdrawal direction.

The retractor 10 includes a sensor mechanism indicated schematically at 44. The sensor mechanism 44 includes an inertia mass 46. In certain circumstances, such as vehicle deceleration at a rate above a predetermined rate, the inertia mass 46 is moved, in a known manner, to cause the pawl 45 to move into engagement with the ratchet 43, to block rotation of the spool 32 in the belt withdrawal direction.

The sensor mechanism 44 also includes a webbing sensitive actuation mechanism indicated schematically at 48. In many circumstances, rapid vehicle deceleration leads to rapid forward movement of the vehicle occupant against the torso portion 28 of the belt webbing 16 and consequent rapid withdrawal of the belt webbing from the retractor 10. In those circumstances, the webbing sensitive actuation mechanism 48 moves the pawl 45 of the spool locking mechanism 42 into engagement with the ratchet 43 to block rotation of the spool 32 in the belt withdrawal direction.

The retractor 10 includes a cover 50 for covering the sensor mechanism 44. The cover 50 is secured to the base 30 in a manner not shown and forms one end (the right end as viewed in FIG. 2) of the retractor 10. The cover 50 has a box-shaped main body portion 52 (FIG. 3) including a planar central portion 54, an upper side portion 56, a lower side portion 58, and front and back side portions 60 and 62. The central portion 54 has an outer major side surface 64 presented generally away from the spool 32 of the retractor 10.

The cover 50 includes four energy absorbing legs 70, 72, 74 and 76. The legs 70–76 are formed as one piece with the other portions of the cover 50, on the outer periphery of the cover. Two of the legs 70 and 72 are formed at the edge of the central portion 54 of the cover 50 located where the central portion of the cover merges with the front side portion 60. The other two legs 74 and 76 are formed at the edge of the central portion 54 of the cover 50 located where the central portion of the cover merges with the back side portion 62 of the cover.

The four legs 70–76 are identical to each other. Therefore, only the leg 70 will be described in detail.

The leg 70 (FIG. 4) includes a first portion 80 and a second portion 82. The first portion 80 projects from the main body portion 52 of the cover 50. The second portion 82 of the leg 70 is located at the outer end of the first portion 80. The second portion 82 of the leg 70 is the portion of the leg that is farthest from the main body portion 52 of the cover 50.

The first portion 80 of the leg 70 has a generally planar configuration including opposite first and second major side surfaces 84 and 86 that extend generally parallel to each other. Opposite first and second minor side surfaces 88 and 90 of the leg 70 extend between and interconnect the first and second major side surfaces 84 and 86. The minor side surfaces 88 and 90 angle in toward each other as they extend from the main body portion 52, so that the first portion 80 of the leg 70 tapers in a direction from the central portion 54 of the cover 50 to the second portion 82 of the leg.

The second portion 82 of the leg 70 extends outward from the first portion 80 as a continuation of the first portion. The second portion 82 has a generally cylindrical configuration including a cylindrical outer side surface 92. The surface 92 merges with the second major side surface 86 of the leg 70 at a break line identified at 94. The surface 92 merges with the first major side surface 84 of the leg 70 at a break line identified at 96. The cylindrical outer side surface 92 of the second portion 82 of the leg 70 is the portion of the cover 50 that is farthest from the spool 32 of the retractor 10.

The central portion 54 of the cover 50 is generally planar in configuration. The retractor 10 has a center of mass that lies along a line extending parallel to the axis 36. That line, when projected to the cover 50, intersects the central portion 54 of the cover at a right angle at a point designated 100 in FIG. 3. The legs 70 and 72 are preferably located equidistant from the point 100 along the plane of the central portion 54 of the cover 50. Also, the leg 74 is preferably located the same distance from the point 100 as the leg 76. This preferred placement of the legs 70–76 must be made within the constraints of the overall dimensions of the cover 50. Thus, the legs 70–76 may, alternatively, be located elsewhere on the cover, consistent with the goal of the equal spacing from the center of mass point 100.

The legs 70–76 are resiliently deformable to absorb energy of impacts to the retractor 10. During the drop test, the retractor 10 is dropped with the cover 50 lowermost and parallel to the ground surface. When the retractor 10 strikes or impacts the ground surface, the second portions 82 of the legs 70–76 contact the ground surface. The legs 70–76 deflect and absorb energy of impact to the retractor 10, moving from the position shown in solid lines in FIG. 5 to the position shown in dash-dot lines in FIG. 5. The deflection of the legs 70–76 minimizes the possibility of the central portion 54 of the cover impacting the ground surface when the retractor is dropped in the drop test.

The energy absorbing portions 70–76 of the retractor 10 are advantageously located on the sensor cover 50 because the most breakable portions of the retractor, those of the sensor mechanism 44, are located under the cover. Without such an energy absorbing structure, if the retractor 10 were to be dropped on the cover 50, the cover could bend or flex inward, possibly breaking or damaging a portion of the sensor mechanism 44. The energy absorbing legs 70–76 on the cover 50 can eliminate damage to the parts of the sensor mechanism 44 by absorbing energy of impact to the retractor 10, preventing the main body portion 52 of the cover from bending or flexing inward toward the sensor mechanism 44.

From the above description of the invention, those skilled in the art will perceive improvements, changes and modifications in the invention. For example, more than four energy absorbing legs could be provided or, with a different cover configuration, fewer than three legs could be provided. Such improvements, changes and modifications within the skill of the art are intended to be covered by the appended claims.

Having described the invention, I claim:

1. A seat belt retractor for a vehicle, comprising:
   a base;
   a spool supported on said base for rotation relative to said base about an axis in a belt retraction direction and an opposite belt withdrawal direction;
   a length of belt webbing wound on said spool and extensible from said retractor for helping to protect an occupant of the vehicle;
   a spool locking mechanism for blocking rotation of said spool in the belt withdrawal direction;
   a sensor mechanism supported on said base; and
   a cover secured to said base and having a main body portion covering said sensor mechanism, said cover having a plurality of legs projecting from said main body portion such that said plurality of legs resiliently bend to absorb energy of impact to said retractor.

2. A retractor as set forth in claim 1 wherein said plurality of legs comprises at least first and second legs spaced apart from each other on the outer periphery of said cover.

3. A retractor as set forth in claim 1 wherein said sensor mechanism includes an inertia member movable in response to vehicle deceleration at a rate above a predetermined rate to actuate said spool locking mechanism.

4. A retractor as set forth in claim 1 having a center of mass that lies along a line which intersects said cover at a point, two of said plurality of legs being located equidistant from said point of intersection.

5. A retractor as set forth in claim 1 wherein each one of said legs has an outermost surface that is curved.

6. A retractor as set forth in claim 5 wherein said curved surfaces on said legs are the portions of said cover that are farthest from said spool.

7. A retractor as set forth in claim 1 wherein said sensor mechanism includes a webbing sensitive mechanism actuatable in response to spool rotation at a rate above a predetermined rate to actuate said spool locking mechanism, said cover main body portion covering said webbing sensitive mechanism.

8. A retractor as set forth in claim 1 wherein said cover forms one end of said retractor and said energy absorbing feet are the portions of said cover that are farthest from said spool.

9. A retractor as set forth in claim 1 wherein each of said plurality of legs has a first minor side surface and a second minor side surface opposite said first minor side surface, said minor side surfaces tapering toward each other as each said leg extends away from said main body portion.

10. A retractor as set forth in claim 1 wherein each of said plurality of legs has a first major side surface and a second major side surface opposite said first major side surface, said major side surfaces extend ing parallel to each other as each said leg extends away from said main body portion, and said major side surfaces projecting at a non-right angle away from said main body portion.

11. A seat belt retractor for a vehicle, comprising:

a base;

a spool supported o n said base for rotation relative to said base about an axis in a belt retraction direction and an opposite belt withdrawal direction;

a length of belt webbing wound on said spool and extensible from said retractor for helping to protect an occupant of the vehicle;

a spool locking mechanism for blocking rotation of said spool in the belt withdrawal direction;

a sensor mechanism supported on said base; and a cover secured to said base and having a main body portion covering said sensor mechanism, said cover having a plurality of legs projecting from said main body portion that are resiliently deformable to absorb energy of impact to said retractor, said retractor having a center of mass that lies along a line which intersects said cover at a point of intersection, two of said plurality of legs being located equidistant from said point of intersection.

12. A seat belt retractor for a vehicle, comprising:

a base;

a spool supported on said base for rotation relative to said base about an axis in a belt retraction direction and an opposite belt withdrawal direction;

a length of belt webbing wound on said spool and extensible from said retractor for helping to protect an occupant of the vehicle;

a spool locking mechanism for blocking rotation of said spool in the belt withdrawal direction;

a sensor mechanism supported on said base; and a cover secured to said base and having a main body portion covering said sensor mechanism, said cover having a plurality of legs formed as one-piece with said main body portion, said plurality of legs projecting from said main body portion and being resiliently deformable to absorb energy of an impact to said retractor.

* * * * *